US006810350B2

(12) United States Patent
Blakley

(10) Patent No.: US 6,810,350 B2
(45) Date of Patent: Oct. 26, 2004

(54) DETERMINATION OF PHARMACEUTICAL EXPIRATION DATE

(75) Inventor: Daniel Robert Blakley, Philomath, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/630,819

(22) Filed: Jul. 29, 2003

(65) Prior Publication Data

US 2004/0019453 A1 Jan. 29, 2004

Related U.S. Application Data

(63) Continuation of application No. 10/136,058, filed on Apr. 29, 2002, now Pat. No. 6,691,058.

(51) Int. Cl.[7] .......................... G04F 10/00; G06F 11/30; G06F 15/00
(52) U.S. Cl. .......................... 702/130; 702/99; 702/117; 702/184; 702/185
(58) Field of Search .......................... 702/99, 127, 130, 702/176–177, 182, 184, 185, 188, 81–82, 85; 700/235–237, 241; 340/540, 573.1

(56) References Cited

U.S. PATENT DOCUMENTS

| 5,394,866 | A | | 3/1995 | Ritson et al. |
| 5,473,146 | A | | 12/1995 | Goodwin, III |
| 5,554,967 | A | | 9/1996 | Cook et al. |
| 5,676,129 | A | * | 10/1997 | Rocci et al. ........... 128/200.23 |
| 5,751,257 | A | | 5/1998 | Sutherland |
| 6,198,383 | B1 | | 3/2001 | Sekura et al. |
| 6,314,384 | B1 | | 11/2001 | Goetz |
| 6,337,836 | B1 | | 1/2002 | Eidelson |
| 6,411,567 | B1 | * | 6/2002 | Niemiec et al. ............... 368/10 |
| 6,513,901 | B1 | | 2/2003 | Walker |
| 6,574,166 | B2 | * | 6/2003 | Niemiec ...................... 368/10 |

* cited by examiner

Primary Examiner—Bryan Bui

(57) ABSTRACT

A temperature sensor coupled to a supply of medication measures the temperature of the medication. A real time clock circuit is programmed with a start date and controller integrated circuitry controls operation of the clock and temperature sensor. The controller is programmed with medication temperature profile data that is specific to the medication. The controller integrates temperature and time data with medication temperature profile data for the medication to calculate an expiration date that corresponds to a potency condition for the medication.

30 Claims, 2 Drawing Sheets

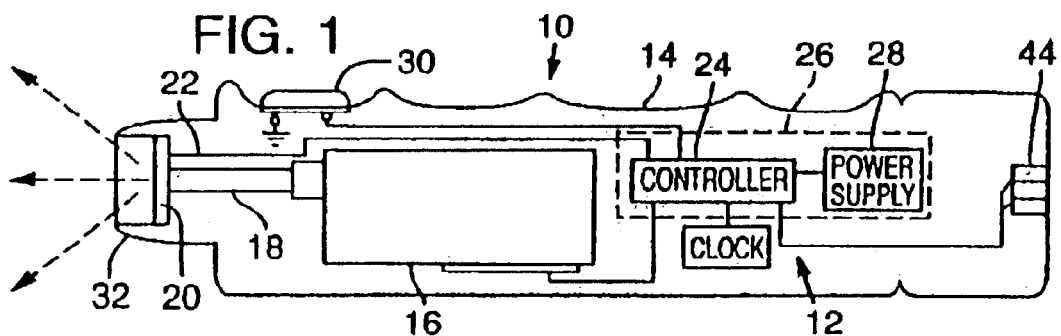
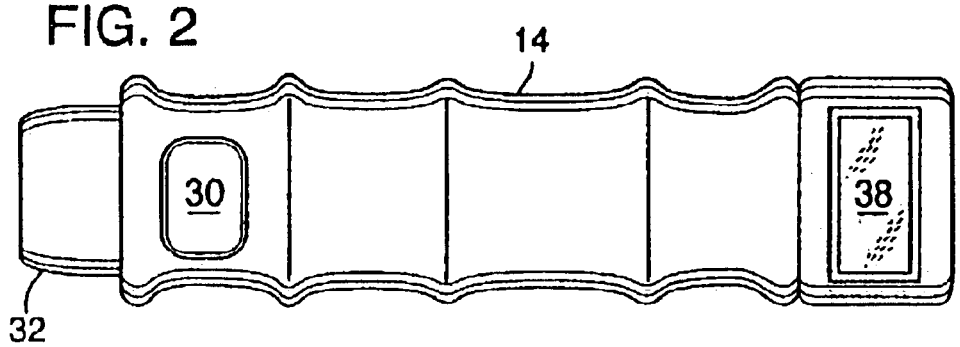
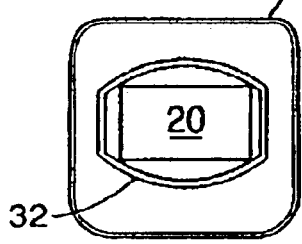
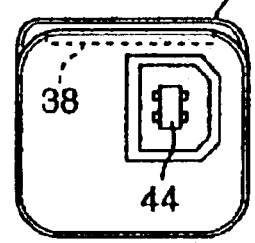
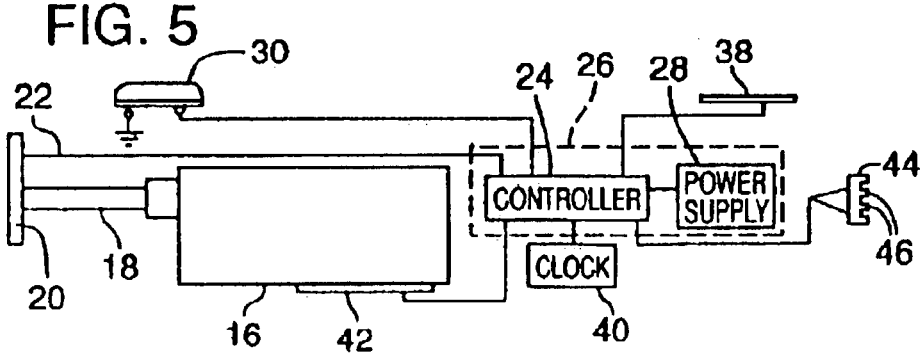

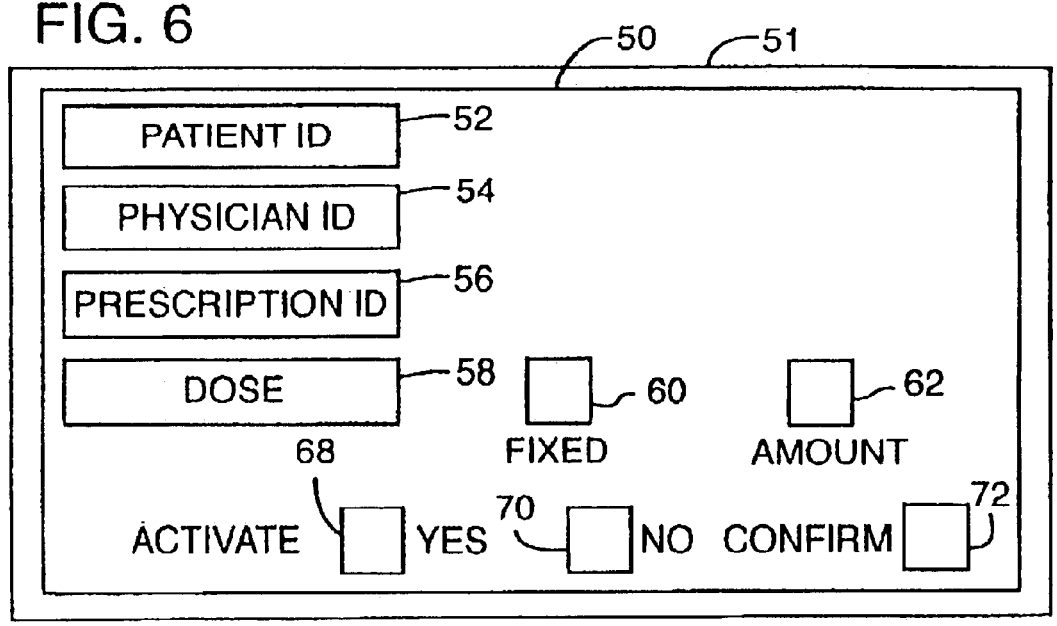
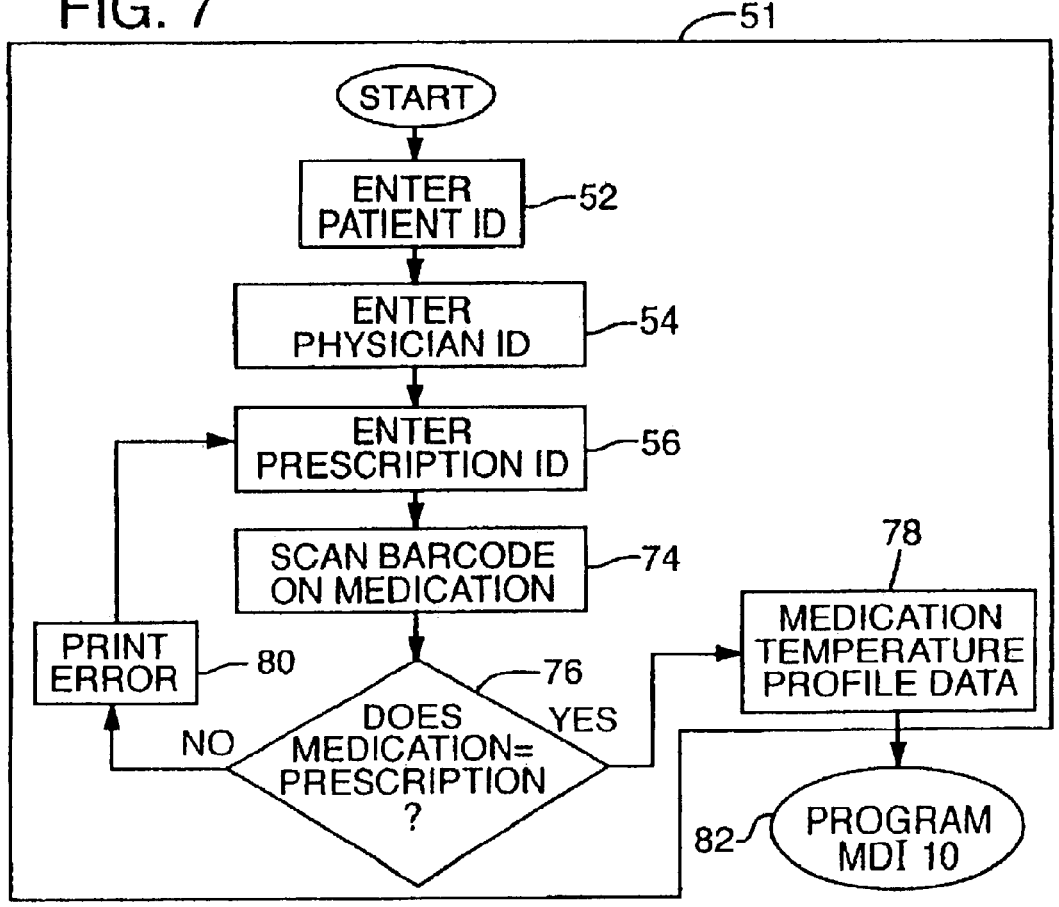

DETERMINATION OF PHARMACEUTICAL EXPIRATION DATE

CROSS REFERENCE TO RELATED APPLICATION(S)

This is a continuation of application Ser. No. 10/136,058, filed Apr. 29, 2002 now U.S. Pat. No. 6,691,058, which is hereby incorporated by reference herein.

TECHNICAL FIELD

This invention relates to apparatus and methods for determining the expiration date of medications and other compounds.

BACKGROUND OF THE INVENTION

Over-the-counter (OTC) medications and many prescription medications are distributed to patients in containers that are labeled with an expiration date. Most consumers are familiar with the "use by" or "expires on" language used by pharmaceutical manufacturers to alert consumers of the date after which the medication should not be used. Although there are several different criteria for determining what constitutes a medication's expiration date, the date printed on a label typically takes into account the fact that over time, active ingredients in medications can lose much of their potency. The expiration date of a medication is thus a measure of the therapeutic potency and effectiveness of the medication. The inclusion of an expiration date on a label thus provides important information to consumers, since the consumer is readily able to determine whether the medication should be used. Expiration information is needed for OTC drugs, which may remain on a consumer's shelf for an extended period of time, and also on prescription drugs that may be retained by a patient after a treatment regime is completed or that may lose some potency during a treatment regime.

The expiration date of a medication is often determined by the pharmaceutical manufacturer using statistical methodology that takes into account predicted environmental conditions to which the drug will be exposed. Many environmental conditions have an impact on pharmacologically active compounds; in practice the primary environmental condition that impacts the therapeutic effectiveness of a medication is the temperature to which the medication is exposed. Normally, a higher temperature causes more rapid degradation of active ingredients contained in medication, and therefore a more rapid degradation of the medication's therapeutic effectiveness. Conversely, most medications have a longer therapeutically effective life when stored at lower temperatures. As such, and because a manufacturer has no way of knowing, predicting or controlling the actual temperatures to which a medication will be exposed, the expiration dates printed on labels are predictions based on statistically expected ambient temperature conditions. Expiration dates typically are conservatively predicted using such statistical models to ensure that patients use effective medications.

Once a medication leaves the manufacturing facility there are few opportunities for the manufacturer to control storage conditions. This is especially true of OTC medications that are distributed and sold through retail channels. Since a medication will rarely be exposed to the ambient temperature conditions that are used in statistical models used to predict shelf life, the actual therapeutically effective life of a medication will rarely be the same as the predicted expiration date that is printed on a label. Stated otherwise, in most cases the actual time that a medication is therapeutically effective is either greater than the predicted expiration date (if the medication is actually stored at relatively low temperatures), or less than the predicted date (if stored at relatively higher temperatures). The result is that medications are either thrown out earlier than they should be, or worse, are consumed later than they should be and when they might have reduced potency and effectiveness.

SUMMARY

The illustrated embodiment comprises apparatus for determining the expiration date of a medication supplied in a container. A temperature sensor measures the temperature of the medication over time, which is measured by a real time clock circuit. Temperature data and temperature exposure over time is compared to predetermined medication temperature profile data specific to the medication to generate an expiration date of the medication.

BRIEF DESCRIPTION OF THE DRAWINGS

FIG. 1 is a schematic side elevation view of an illustrated embodiment of the present invention as it is incorporated into a metered dose inhaler apparatus, which is one example of a medication container with which the illustrated embodiment may be used.

FIG. 2 is a top view of the metered dose inhaler shown in FIG. 1.

FIG. 3 is a left side elevation view of the metered dose inhaler shown in FIG. 1, illustrating the front or mouthpiece end of the inhaler.

FIG. 4 is a right side elevation view of the metered dose inhaler shown in FIG. 1, illustrating the rear of the inhaler.

FIG. 5 is a schematic representation of an electrical circuit of the expiration date determining unit in accordance with the illustrated embodiment of the invention.

FIG. 6 shows an example of a programming interface window for entering medication information in accordance with the illustrated embodiment of the invention into a computer.

FIG. 7 is a flow chart setting forth operating steps in accordance with the illustrated embodiment.

DETAILED DESCRIPTION OF ILLUSTRATED EMBODIMENTS

A pharmaceutical container 10 that incorporates an illustrated embodiment of a programmable electronic expiration date determining unit, illustrated generally with reference number 12, is shown in FIG. 1. The illustrated embodiment of the expiration date determining unit 12 is described herein as it is embodied in pharmaceutical container 10, which in this case is a pulmonary delivery mechanism known as a metered dose inhaler (MDI). MDIs are widely used for the delivery of aerosolized medications such as asthma medication and there are many variations of MDI delivery systems on the market. An MDI typically combines a drug with a propellant in a container that may be pressurized. The drug may be in the form of a liquid or a fine powder. Actuation of the device releases metered doses of aerosolized drug that is inhaled by the patient.

It will be appreciated that the MDI 10 illustrated in FIG. 1 is intended only to illustrate one of many possible pharmaceutical containers and delivery systems that may incorporate the expiration date determining unit 12 described herein. Thus, the invention is not limited to use with an MDI or any other specific type of pharmaceutical container. Moreover, the expiration date determining unit 12 may be used with medications provided in numerous forms, including liquids, aerosols, powders, tablets, pills, gels and other delivery forms. As used herein, the term "medication" is used generally to refer to any substance or compound, whether biological or chemical, delivered to a patient for treatment of a medical condition. Other common words may be used interchangeably, such as "pharmaceutical."

Before turning to a detailed description of the expiration date determining unit 12, the primary components of container 10 will be described.

Container 10 comprises an inhaler housing 14 that is configured to contain a supply 16 of medication (which as noted could be a liquid or powder, etc.). Because in the illustrated embodiment container 10 is an MDI, it is sometimes herein referred to as MDI 10. The medication supply 16 is coupled, as for example by a needle and septum interconnection or other airflow regulator such as a thermal resistive element or piezo element, to a conduit 18 in the housing so that the medication in supply 16 is directed to a drop generator head, illustrated schematically at 20, that carries multiple drop generators (not shown in detail) configured for generating appropriately sized aerosolized drops or particles. The drop generator head used in an MDI such as the one illustrated typically include resister-based nozzles that eject droplets of fluid (or powders) for inhalation. It will be appreciated that the illustration of FIG. 1 is schematic, and that an MDI must necessarily be designed to have the capability for the patient inhale a substantial volume of air with which the medication is mixed. The air supply sources for MDI are not shown in the figures.

The drop generator head 20 is electrically interconnected to a controller, shown schematically at 24, which is part of the MDI control system 26, for example with a flex circuit 22. Among other functions described below, controller 24 generates and sends suitably conditioned control signals to drop generator head 20 to initiate delivery of the medication. The MDI control system 26 includes controller 24, a power supply 28 and operator switch 30. The controller 24 is an integrated circuit, typically in a CMOS chip that responds to the switch signal by directing to the drop generator head controlled current pulses for firing the drop generators as required. It will be appreciated that the control system can be configured in any of a number of ways and, most preferably, integrated with the housing 14 of the inhaler. Controller 24 includes appropriate processors and memory components. It will be appreciated that in some circumstances the integrated circuitry that defines controller 24 may be incorporated into the real time clock circuit, and vise versa.

In the case where MDI 10 is configured for delivery of medication via inhalation by the patient, the drop generator head 20 is typically located near a mouthpiece 32. The drop generator head illustrated in FIG. 1 is thus located inwardly of the mouthpiece 32 to allow the aerosolized medication to mix with airflow. It will be appreciated that the control system 26 and the arrangement and orientation of the drop generator head 20 in housing 14 provide for both precise metering of the amount of droplets ejected and of the amount of medication expelled, as well as the generation of suitably small droplets. That is, the expulsion of the medication from the medication supply 16 need not be accompanied with other mechanisms for reducing the volume of ejected liquid to suitably small droplets. The ejection route of medication aerosolized out of mouthpiece 32 is shown schematically with a series of arrows in FIG. 1.

Various control mechanisms are used with metered dose inhalers, depending upon the nature and level of control that the prescribing physician wishes to provide to the patient. When such controls are included (none are shown in the illustrated embodiment) the may be activated or inactivated to suit the particular circumstances.

A display panel 38 is used to alert the user of status information and other user-perceptible information. Display panel 38 may be any one of many conventional displays such as a light emitting polymer-sheet or LCD display.

The MDI's control system 26 and the components of the programmable expiration date determining unit 12 will now be detailed with particular reference to FIGS. 1 and 5.

Expiration date determining unit 12 includes a programmable real time clock 40 that preferably comprises a programmable integrated circuit real time clock capable of maintaining the absolute time and date. There are numerous real time clocks commercially available that are suitable for use with the illustrated embodiment, including products from manufacturers such as Dallas Semiconductor Corporation, Maxim Integrated Products, Inc., Epson America, Inc. etc. Although in the figures real time clock 40 is illustrated as a separate component from controller 24, it will be appreciated that the clock circuit may be integrated into the controller circuitry. Unit 12 further includes a temperature sensor 42 operatively coupled to medication supply 16 so that the temperature sensor is capable of detecting and monitoring the actual temperature of the medication contained within the supply reservoir. As with real time clock 40, there are numerous types of temperature sensors that may be used to detect the temperature of the medication—the selection of an appropriate sensor is well within the skill of those of ordinary skill in the art and will depend upon many factors such as the type of medication, the manner in which the medications is contained in a reservoir, etc. With respect to the illustrated embodiment of MDI 10, temperature sensor 42 is directly mounted to the external surface of the medication supply 16 reservoir. Although the temperature sensor is thus not in direct contact with the pharmaceutical contained in the supply reservoir, the temperature of the reservoir itself is in most instance a sufficient approximation of the temperature of the medication to provide reliable data. In some instances it may be desirable to locate the temperature sensor internally within the medication reservoir so that the sensor is in direct contact with the medication. Where the medication is in a container other than the medicine supply 16 illustrated, for example, an OTC medication comprising tablets distributed in a conventional container, the temperature sensor may be located internally within the container. In other cases, for example where a pharmaceutical is distributed in tablet form in unit dose packages or blister packages, the temperature sensor 42 may be operatively coupled to the packaging itself.

Suitable temperature sensors 42 include integrated circuit temperature sensors such as thermisters and resistors, thin film metals, metal oxide semiconductor temperature sensors, CMOS or MOS transistors, bipolar transistors, circuits defining a Wheatstone bridge, and others. Depending upon the specific usage, more than one temperature sensor 42 may be utilized.

Temperature sensor 42 may be configured for measuring the ambient temperature as well as the temperature of the medication supply.

Control system 26 includes a programming interface 44 connected to controller 24 and externally exposed at the rearward end of housing 14 (FIG. 1) for connection to a computer. Programming interface 44 is a conventional interface that includes conductor pads 46 that interconnect the interface through traces (as in a flex circuit) and conventional buss interfaces to controller 24. The illustrated embodiment of programming interface 44 may be replaced, for example, with any suitable programming interface, including an infrared compliant data link, or other similar programming interface.

The programming steps and functional operation of the expiration date determining unit 12 will now be detailed with specific reference to the schematic illustrations of FIGS. 6 an 7.

The expiration date determining unit 12 is operable to monitor and measure the actual temperature of a medication over time, to accumulate and store the temperature and time data and to integrate the temperature and time data to calculate an "expiration" date of the medication. It will be appreciated that in some cases the temperature measured by temperature sensor 42 will be an approximation of the actual temperature of the pharmaceutical. As used herein, the "expiration date" is a real date or event, calculated based on integration of temperature and time data and corresponding to a potency condition of the medication. The expiration date is an event that informs the patient that the monitored medication should not be consumed or otherwise used because the potency of the medication is determined to be insufficient, or for some other conditional reason. Expiration date information may be displayed on display 38.

The expiration date is a relative term that depends upon many factors, including the specific medication in question, the conditions to which the medication is exposed, etc. For instance, the expiration date may be specific to the medication in question. Each medication or pharmaceutical has a unique composition of molecules, some of which are pharmacologically active and some that are pharmacologically inert, that degrade with exposure to temperature. The degradation rate of a medication is specific to that medication. Every medication has a specific temperature degradation profile that is unique to that medication. In other words, different pharmaceuticals exposed to identical temperature conditions degrade and lose their potency at a different rate. As detailed below, temperature degradation profiles for a specific medication may be input into expiration date determining unit 12 for use in determining the expiration date. As another example, the expiration date may in appropriate instances be triggered by a specific temperature event. Thus, if a given medication is deemed to lose its effective pharmacological potency if the temperature to which the medication is exposed exceeds some maximum (or minimum) temperature, such threshold temperature data may be input into unit 12. There are numerous other factors that may be relevant to determination of the expiration date.

Referring now to FIG. 6, an exemplary programming interface window 50 for entering prescription information into a PC, shown schematically at 51, is illustrated. The prescription information and other data described below are used to program the expiration date determining unit 12. It is to be understood that the programming interface window illustrated in FIG. 6 is part of a user-friendly software application installed in PC 51. Less complicated programming devices may be substituted for PC 51.

Prescription data described herein typically will be input into the programming interface window 50 by a pharmacist or physician or other medical professional. Patient ID data 52 is first entered into the PC 51. Sufficient data is included in patient ID data 52 so that the patient data identifies one patient, and may include such conventional data as the patient's name and address, insurance information and unique identification codes as appropriate. Prescribing physician ID data 54 is next entered, and as with patient data 52, typically includes conventional data that identifies a specific prescribing physician.

The prescription ID 56 is entered next. Prescription ID 56 comprises information that identifies the specific pharmaceutical that has been prescribed. Typically included in prescription ID 56 is information corresponding to the name of the medication, the manufacturer, etc. and codes identifying and unique to the prescribed medication.

Dose data 58 is entered next. Dose data 58 is of course dependent upon the prescribing physician's instructions and the nature and extent of the dose information varies according to many factors. In the illustrated embodiment of an MDI 10, dose data 58 may include instructions on whether the administered dosages will be fixed 60. In FIG. 6, fixed 60 doses have been selected and entered into the programming interface. The programming interface then requires information on dosage amount 62, which may be entered in various formats correlating to the desired doses of medication that are to be delivered.

Once all dose data 58 is successfully entered, the user is prompted with an activate query, which comprises check boxes for yes 68 and no 70. If yes 68 is selected, a box for confirm 72 is prompted. Those of ordinary skill in the art will appreciate that the above description is exemplary only and that additional information may be included.

The flow chart of FIG. 7 illustrates the steps involved in programming MDI 10 with prescription information. As noted above, patient ID data 52 and physician ID data 58 are entered into PC 51. Prescription ID data 56 as described above are entered next. PC 51 next requires verification that the actual medication that is being prescribed matches prescription data 56 that have been input. This is preferably accomplished by scanning a barcode 74 printed on the label of a bulk container of the prescription medication. The barcode 74 includes information identifying the specific pharmaceutical, including information corresponding to data entered in prescription data ID 56. If the data input via scanned barcode 74 matches the prescription data 56 then PC 51 acquires medication temperature profile data 78 for the specific medication, as detailed blow. If the data input via scanned barcode 74 fails to match the prescription data 56, then a print error 80 is generated and the user is prompted to re-enter prescription data 56.

Medication temperature profile data 78 comprises data relating to the actual, predicted or calculated rates at which the therapeutic effectiveness of the medication degrades as the medication is exposure to temperature over time. As used herein, the term medication temperature profile data relates to a rate of reduction of the therapeutic effectiveness that may be determined in any one of a number of manners. As noted above, there typically is a unique temperature degradation profile for every medication. During development of medications, pharmaceutical manufacturers may generate temperature degradations profiles for the product. Such profiles developed by the pharmaceutical manufacturer may comprise data relating to the known or predicted rate of degradation of the compounds formulated into the pharmaceutical at known temperatures over time. Medication temperature profile data may thus comprise actual time/temperature degradation profiles for the medication in question. Such data may be provided in any conventional manner, including tabular formats and the like.

Medication temperature profile data may also comprise information corresponding to threshold maximum and minimum temperatures appropriate for a given medication. When a medication is distributed with an expected expiration date printed on a label, as is typically encountered on the market today, the actual temperature degradation profile for that medication is used in statistical models that predict expected ambient temperatures to calculate the expected expiration date that is printed on the label. Such temperature degradation profiles may be utilized in connection with the illustrated embodiment of the present invention to calculate an expiration date that is based on the actual temperatures to which the medication is exposed.

Medication temperature profile data 78 may further comprise equations that include exponential temperature and time functions. Medication temperature profile data 78 may be acquired by PC 51 in any one of several suitable alternate methods. One preferred method is to include the data in the barcode on the label. A pharmaceutical manufacturer may include temperature degradation profiles in a bar code place on bulk containers of the medication that are used by pharmacists to fill prescriptions. In that case, medication temperature profile data 78 are input into PC 51 when the pharmacist scans barcode 74.

Alternately, and by way of example, PC 51 may include in memory a database comprising medication temperature profile data 78 corresponding to each medication ID 56. Once medication ID 56 is input via window 50 into PC 51, medication temperature profile data 78 corresponding to the input medication ID 56 is loaded into the program.

The foregoing are exemplary only of the many different types of data that may be used to define the input medication temperature profile data 78 and the invention is not limited by the manner in which medication temperature profile data 78 are entered into the PC or by the type of data comprising medication temperature profile data 78.

When PC 51 has successfully acquired medication temperature profile data 78, in whatever form it is supplied, MDI 10 may be programmed by downloading programming instructions from PC 51 to controller 24 through programming interface 44 (the step of programming MDI 10 is given reference number 82 in FIG. 7). At the time of programming MDI 10 at 82, real time clock 40 is programmed with clock data such as the current time and date, which are downloaded from PC 51 real time clock 40. In the case where expiration date determining unit 12 is being programmed by a processor other than a computer, real time clock 40 may be programmed with any device capable of generating clock data. Likewise, medication temperature profile data 78 are downloaded from PC 51 to controller 24 where the data a stored in memory such as nonvolatile memory module in the controller.

The MDI 10 is now ready for the prescription to be filled, typically by filling the medication into medication supply 16. At this time, which is typically at step 82, the beginning date or start date is programmed into real time clock 40. At the same time, a nominal or "expected" expiration date is programmed into the real time clock. The expected expiration date is the date that the medication would be expected to be expired, based on statistical models that consider expected ambient temperature exposure, as described above. Inclusion of the nominal expiration date allows for comparison between the expected expiration date and the actual expiration date as determined by expiration date determining unit 12. Alternately, medication temperature profile data may be obtained by using equations or tabular methods, and those data may be integrated with temperature and time data to determine the expiration date.

Once operation of real time clock 40 is begun, temperature sensor 42 begins operation to measure the temperature of the medication in the medicine reservoir 16. Temperature data may be sampled continuously or intermittently, and is transmitted from temperature sensor 42 to controller 24 where it is stored in memory and accumulated. Real time clock data are simultaneously transmitted to controller 24 from real time clock 40. Actual temperature and time data so acquired are integrated in controller 24 and compared to medication temperature profile data 78 or equivalent equations. The integration may be accomplished according to conventional programming architectures, and preferably according to multiply and accumulate functions. Ongoing status information useful to the patient may be displayed on display 38 either with or without the user's prompt.

Controller 24 is programmed to react to temperature and time data in a variety of manners. As one example, internal computation and integration of accumulated temperature and time data with medication temperature profile data may result in a determination that the medication has reached some end of life point, meaning that the accumulated data compared to medication temperature profile data 78 is such that the potency of medication is lower than some predetermined potency threshold needed for continued use of the medication by the patient. When such an expiration date has been calculated, an expiration alert message may be displayed on display 38. With an MDI 10, controller 24 may at the time when an expiration date has been calculated, also deactivate drop generator head 20 so that medication can no longer be dispensed until the prescription is refilled. With a less sophisticated medication container, for example an OTC container of pills, the display 38 associated with the shelf life determination unit 12 may simply display an expired alert message, alerting the consumer to an out-of-date product condition.

With a delivery system that is under the operative control of a processor such as with MDI 10, the dosage of medication delivered may also be increased as the potency of the medication decreases as determined by the temperature and time data is accumulated and integrated by processor 24. This allows the patient to receive a therapeutically effective dosage of medication even though the potency of the medication has decreased due to exposure to temperature over time.

As another example of the determination of an expiration date by expiration date determining unit 12, the medication temperature profile data may as noted above include or be limited to a maximum temperature value. If the actual temperature measured by temperature sensor 42 exceeds the maximum temperature value, then the medication is deemed to have expired and an expiration date is generated. In this case if the temperature sensor 42 detects a temperature value in excess of the maximum, then controller 24 will generate an expired alert message.

It will be appreciated that the expiration date determining unit 12 described above may be used by pharmaceutical manufacturers to monitor the temperature conditions that medications are exposed to prior to the medication being dispensed by a pharmacy. Although it is generally expected that medications will be stored under more controlled temperature conditions while they are in a pharmacy or under the control of the manufacturer, it is valuable to know the historical conditions to which the product has been exposed. In addition, a pharmacist may use such information to determine that a medication has sufficient potency to be prescribed.

Having here described illustrated embodiments of the invention, it is anticipated that other modifications may be made thereto within the scope of the invention by those of ordinary skill in the art. It will thus be appreciated and understood that the spirit and scope of the invention is not limited to those embodiments, but extend to the various modifications and equivalents as defined in the appended claims.

What is claimed is:

1. Apparatus for determining potency of a medication, comprising:
   a supply of medication in a container;
   a temperature sensor operatively coupled to the container and capable of measuring the temperature of the medication to generate temperature data;
   a programmable rear time clock;
   a controller programmed with medication temperature profile data specific to the medication, wherein the controller integrates temperature data and time data with medication temperature profile data on a continuous basis to generate a potency value for the medication and said controller calculates a medication dosage in response to the potency value.

2. The apparatus of claim 1 wherein the controller accumulates temperature data and compares the temperature data to the medication temperature profile data according to a multiply and accumulate function to generate the potency value.

3. The apparatus of claim 1 including a programming interface operatively connected to the controller so that time data and medication temperature profile data may be programmed into the controller.

4. The apparatus of claim 1 including a display operatively connected to the controller for providing perceptible information corresponding to the potency value.

5. The apparatus of claim 4 wherein the container comprises a metered dose inhaler comprising a drop generator coupled to the supply of medication and the controller is configured for deactivating the drop generator in response to generation of a potency value that exceeds a predetermined threshold value.

6. The apparatus of claim 1 wherein the potency value corresponds to a predetermined potency condition of the medication based on integration of temperature date and time data with medication temperature profile data.

7. The apparatus of claim 1 wherein the controller includes means for changing the dosage of medication in response to predetermined potency value of the medication based on integration of temperature date and time data with medication temperature profile data.

8. The apparatus of claim 1 wherein the temperature sensor comprises a temperature sensing integrated circuit in direct contact with the medication.

9. The apparatus of claim 1 wherein the temperature sensor comprises a temperature sensing integrated circuit in direct contact with the container.

10. The apparatus of clam 1 including a temperature sensor configured for measuring ambient temperature.

11. The apparatus of claim 1 wherein the container comprises a metered dose inhaler having a drop generator capable of expelling a dosage of medication through a mouthpiece.

12. The apparatus of claim 11 wherein the controller is programmed for adjusting the dosage of medication expelled through the mouthpiece in response to integration of temperature data and time data with medication temperature profile data.

13. The apparatus of claim 11 wherein the controller is programmed for disabling the drop generator in response to an expiration date.

14. A method of determining the potency of a medication in a medication delivery apparatus, comprising the steps of:
   (a) monitoring the temperature of the medication over time;
   (b) accumulating temperature data generated in step (a);
   (c) comparing over time the accumulated temperature data with medication temperature profile data specific to the medication;
   (d) calculating over time a potency condition of the medication based on the comparison of the accumulated temperature data with medication temperature profile data; and
   (e) if the calculated potency condition equals a predetermined potency threshold, providing an alert of medication expiration condition and disabling the medication delivery apparatus.

15. The method of claim 14 including the step of delivering a dosage of medication determined by the comparison of the accumulated temperature data with medication temperature profile data.

16. Apparatus for determining the therapeutic potency of a medication, comprising:
   a temperature sensor operatively connected to a supply of a medication such that the temperature sensor measures the temperature of the medication to generate temperature data;
   a real time clock circuit programmed with a begin date;
   a controller programmed with medication temperature profile data specific to the medication and configured for accumulating temperature data and calculating an ongoing therapeutic potency condition based on comparison of the temperature data and medication temperature profile data;
   means for delivering medication in a dosage determined by the therapeutic potency condition.

17. The apparatus of claim 16 including a user-readable display, and wherein when an expiration date is calculated an expiration alert message is displayed the user-readable display.

18. The apparatus of claim 16 including means for ceasing delivery of medication when a predetermined potency threshold is met.

19. The apparatus of claim 18 wherein the supply of medication is contained in a metered dose inhaler.

20. A medication delivery apparatus, comprising:
   a housing including a mouthpiece;
   a supply of medication carried in a container in the housing;
   a temperature sensor operatively coupled to the container and configured for measuring the temperature of the medication to generate temperature data;
   a programmable real time dock;
   a programmable controller with medication temperature profile data specific to the medication, wherein the controller is programmed to calculate on an ongoing basis a potency condition for the medication; said controller programmed to deactivate the apparatus in response to a calculated potency value that exceeds a predetermined threshold value.

21. The medication delivery apparatus of claim 20 wherein the controller integrates temperature data and time data with medication temperature profile data to generate the potency condition.

22. The medication delivery apparatus of claim 21 wherein the controller is programmed to calculate an expiration date for the medication when integration of temperature data and time data with medication temperature profile data generates a result that meets a predetermined threshold value.

23. The medication delivery apparatus of claim 22 including a drop generator configured for generating droplets of medication and expelling the droplets through the mouthpiece in response to activation of a switch.

24. The medication delivery apparatus of claim 23 wherein the controller is programmed to deactivate the switch in response to calculation of an expiration date.

25. A pharmaceutical container, comprising:

medication supply means for containing a pharmaceutical;

temperature sensor means for measuring the temperature of the pharmaceutical and for thereby generating temperature data;

real time clock means;

medication delivery means for delivering a controlled dosage of the medication to a patient;

controller means with medication temperature profile data specific to the medication, the controller means configured for calculating a medication potency condition based on integration of temperature data and medication temperature profile data over time; said controller means configured for deactivating the medication delivery means to prevent delivery of medication if the calculated medication potency condition meets a predetermined threshold.

26. The apparatus of claim 25 wherein the temperature sensor means further comprises a temperature sensing integrated circuit.

27. The apparatus of claim 25 wherein the real time clock means further comprises a programmable real time clock integrated circuit.

28. The apparatus of claim 25 including medication delivery means for delivering a controlled dosage of the medication to a patient and wherein the controller means further comprises means for controlling the dosage of delivered medication based upon the calculated potency condition.

29. A method of determining the potency of a medication in a medication delivery apparatus configured for delivering a dosage of medication to a patient, comprising the steps of:

(a) monitoring the temperature of the medication over time;

(b) accumulating temperature data generated in step (a);

(c) comparing over time the accumulated temperature data with medication temperature profile data specific to the medication;

(d) calculating over time a potency condition of the medication based on the comparison of the accumulated temperature data with medication temperature profile data; and (e) adjusting the dosage of medication delivered to the patient in response to the calculated potency condition.

30. Apparatus for determining the therapeutic potency of a medication, comprising:

a temperature sensor operatively connected to a supply of a medication such that the temperature sensor measures the temperature of the medication to generate temperature data;

a real time clock circuit programmed with a begin date;

a controller programmed with medication temperature profile data specific to the medication and configured for accumulating temperature data and calculating an ongoing therapeutic potency value based on comparison of the temperature data and medication temperature profile data; and means for changing the dosage of medication delivered to a patient in response to the therapeutic potency value.

* * * * *

UNITED STATES PATENT AND TRADEMARK OFFICE
CERTIFICATE OF CORRECTION

PATENT NO. : 6,810,350 B2
DATED : October 26, 2004
INVENTOR(S) : Blakley

It is certified that error appears in the above-identified patent and that said Letters Patent is hereby corrected as shown below:

Column 9,
Line 16, delete "rear" and insert therefor -- real --.

Column 10,
Line 56, delete "dock," and insert therefor -- clock, --.

Signed and Sealed this

Twenty-eighth Day of June, 2005

JON W. DUDAS
*Director of the United States Patent and Trademark Office*